UNITED STATES PATENT OFFICE.

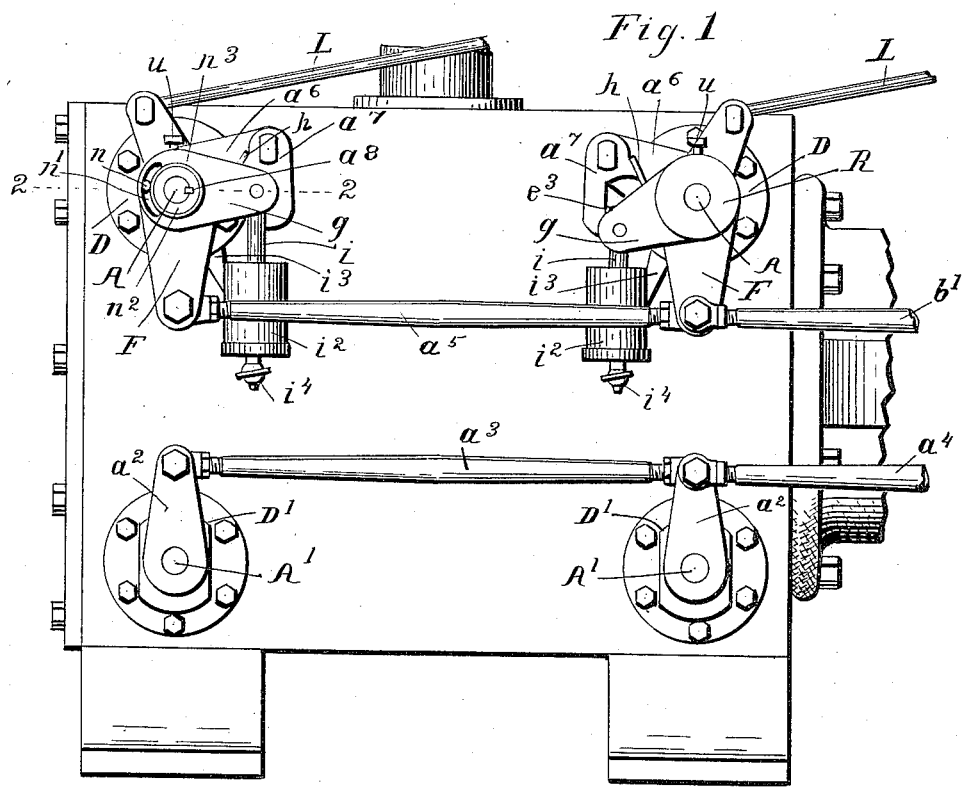

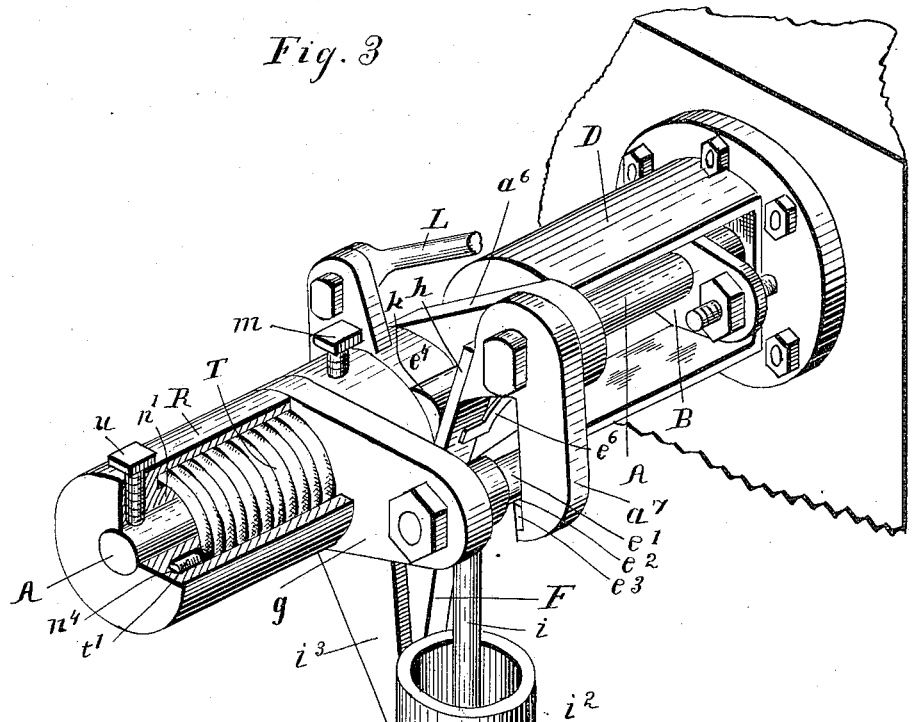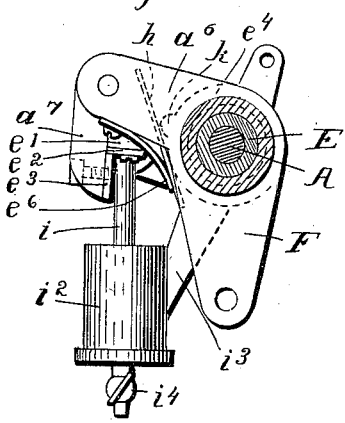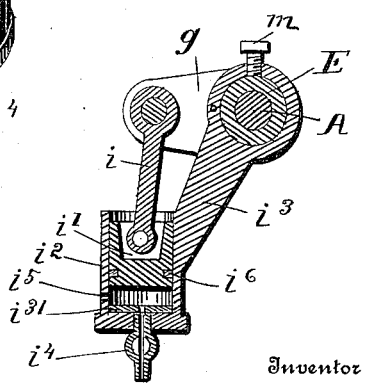

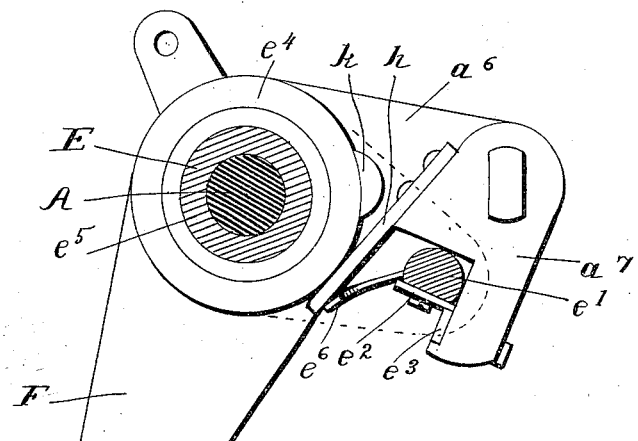
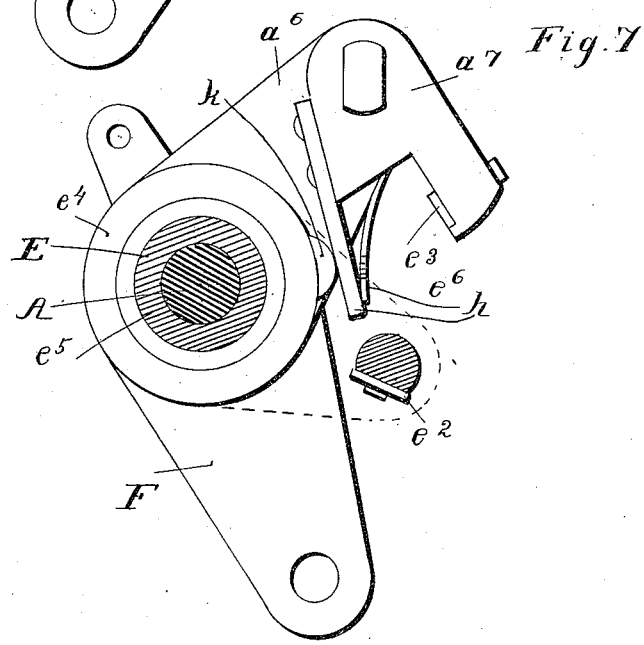

NELSON W. TWISS, OF NEW HAVEN, CONNECTICUT.

LIBERATING CUT-OFF-VALVE GEAR.

1,006,808.

Specification of Letters Patent. Patented Oct. 24, 1911.

Application filed September 17, 1908. Serial No. 453,528.

*To all whom it may concern:*

Be it known that I, NELSON W. TWISS, a citizen of the United States, and resident of New Haven, in the county of New Haven and State of Connecticut, have invented certain new and useful Improvements in Liberating Cut-Off-Valve Gear, of which the following is a full, clear, and exact specification.

My invention relates to an improvement in liberating cut-off valve gear for steam engines of the class in which separate valves are employed for the various valve functions, as in the well known "Corliss" system.

The invention has for its object to provide improved spring closing and air cushioning cut off valve mechanism, and it consists in the novel combination, arrangement and construction of parts as hereinafter more fully described and claimed.

In the accompanying drawings forming a part of this specification, Figure 1 is a front elevation of a steam cylinder of the "Corliss" type, and valve gearing embodying my improvements, the valve spring and its case being removed from one of the steam valves to show remaining parts. Fig. 2 is a central horizontal longitudinal section through one of the cut off or steam valve gears on line 2—2, Fig. 1. Fig. 3 is a perspective view of one of the cut off valve gears showing the cut off mechanism in the act of liberating from the driving mechanism. Fig. 4 is a vertical cross section on line 4—4, Fig. 2 viewed from the cylinder end of the mechanism. Fig. 5 is a similar view of a vertical cross section on the line 5—5, of Fig. 2. Figs. 6 and 7 are cross sectional views on the line 6—7, Fig. 2, showing the bell crank respectively at the extreme limits of the throw, with the position of the steam valve crank indicated by dotted lines.

Referring to the drawings, the arrangement of the valves with my improved valve gearing will be recognized as that of the well known "Corliss" system, in which the separate induction valves are seated at the respective ends of the cylinder on the upper side thereof, and the exhaust valves are similarly and separately placed at the lower side of the cylinder. The valves proper are of the regular "Corliss" type, here requiring no description, seated in cylindrical valve seats in the steam and exhaust chambers in which they are adapted to be oscillated by valve stems A, $A^1$ journaled in the bonnets D, $D^1$, and stuffing boxes B of the bonnets, which form steam tight joints around the valve stems where they enter the steam chambers. The exhaust valve cranks $a^2$ are secured upon the outer ends of the stems $A^1$ of the exhaust valves, and connected together by the rod $a^3$, which is driven in the ordinary manner by the rod $a^4$, connecting the forward crank with the engine eccentric, here not requiring to be shown. By means of a similar eccentric driven rod $b^1$ the bell cranks of the steam valve gear are oscillated, both being connected together similarly to the exhaust valve cranks by a rod $a^5$. These features of the valve gear are old and require no more extended description.

The steam bonnets D, bolted to the upper part of the cylinder, are of the skeleton construction required to receive the stuffing boxes B around the valve stems adjacent to the cylinder, and are each formed with a cylindrical extension or sleeve E, external to the skeleton part. The steam valve stems A are journaled in and project out through the bearings in the sleeves from the valves $b^{11}$, and have the steam valve cranks $g$ keyed upon them contiguous to the ends of the sleeves by means of keys $a^8$.

Upon the sleeves E, the bell cranks of the steam valve gear are journaled, each comprising the depending lever F, to which the rod $a^5$ is connected, and the lever $a^6$ on which the depending hook $a^7$ is pivoted. The hook is adapted to engage with the pin $e^1$ projecting from the end of the steam valve crank into the plane of oscillation of the hook. The engaging surfaces of these parts are preferably formed by hardened shoulders or catch blocks $e^2$, $e^3$ respectively attached to the arm and hook as shown. A trip arm $h$ is secured to the hook, projecting toward the sleeve E into the path of a cam $k$ on a cam lever $e^4$, which is journaled on a hub $e^5$ on the bell crank. A spring $e^6$ secured to the lever $a^6$ and bearing on the lower side of the trip arm normally presses the hook into engagement with the steam valve crank pin $e^1$, and the disengagement of said parts in the cut off action is effected by engagement of the trip arm with the cam in the normal oscillation of the bell crank on the sleeve E.

Fig. 3 shows the trip arm in engagement with the cam, and the hook in the act of releasing the shoulder $e^2$ of the pin $e^1$. In the operation of the mechanism, the point at which the hook engages the arm $e^1$ and thereby connects the steam crank $g$ with the eccentric driven bell crank, is the extremity of the downward oscillation of the hook, which position is shown in Fig. 6. The disengagement of the parts takes place at different points through a range of cut off varying from zero to about five eighths of the stroke, as determined by the position of the cam $k$, which is adjusted automatically to effect such variation of the motive action through the connecting rods L, by means of the steam engine governor, not requiring to be here shown.

The closing movement of the steam valve at the point of release is effected by the resilience of a spring, through the mechanism hereinafter described, which constitutes my particular improvement, as follows: Pivoted on the steam valve crank arm $e^1$ adjacent to the crank is a plunger rod $i$, pivotally connected to a plunger $i^1$, which is fitted to travel in an air cup $i^2$, supported on a stationary bracket $i^3$, rigidly secured upon the end of the sleeve E of the steam bonnet D, between the steam crank $g$ and the cam lever $e^4$, by means of the set screw $m$. At the bottom of the air cup is a plunger cushioning stop $i^{31}$ of leather or other suitable material, perforated in alinement with the passage through an air cock $i^4$ inserted in the bottom of the air cup. At a short distance above the stop is an orifice $i^5$ in the wall of the air cup, and the plunger is rendered substantially air tight by means of a packing ring $i^6$, or other suitable method.

Rigidly secured in the stationary bracket $i^3$ is a pin $n$, which projects into a slot $n^1$ in the steam crank $g$, of sufficient length to permit the throw of the crank relative thereto. The crank is provided with a hub $n^2$, bearing a ring $n^3$ loosely fitted thereon, and held in place by the pin $n^{41}$ secured in the hub outside of the ring. On the end of the valve stem A a cylindrical case R is rigidly secured by a set screw $u$ passing through the solid end of the case. The case is provided with an interior hub $n^{11}$ of the diameter of the ring $n^3$, and a hole $n^4$ is drilled in the end wall of the case exterior to the hub. A spiral spring T, having the ends $t$, $t^1$ of the wire of which it is composed bent over parallel to the axis of the coil, is arranged around the valve stem within the case, with the ends of the coil received respectively upon the hub $n^{11}$ and ring $n^3$, and the ends of the wire $t$, $t^1$ respectively bearing upon the pin $n$ of the stationary bracket, and the case R, by insertion in said hole $n^4$.

With the parts thus constructed and arranged, the spring may be given any required tension by turning the case around upon the shaft before it is permanently secured thereon by means of the set screw $u$. Then in operation the spring will exert its tension in opposite directions on the valve stem and stationary bracket, and instantaneously effect the closing of the steam valve when it is released from the hook $a^7$, by the operation of the mechanism hereinbefore described. In the act of closing the movement of the valve is positively arrested by the contact of the plunger $i^1$ with the leather covered bottom of the air cup $i^2$, after its momentum is first overcome by compression of the air below the orifice $i^5$, such cushioning being regulated by the air cock $i^4$. In the ascent of the plunger, said air passages permit the free movement of the parts at the slower speed then imparted to them by the engine eccentric.

In the above construction, the pin $e^1$, which projects from the end of the steam valve crank into the plane of oscillation of the hook $a^7$ and is engaged by the hook to impart the motion of the eccentric to the steam valve crank, serves as the crank pin or journal to which the plunger rod $i$ is connected. This single part therefore serves a double purpose, and combines both of said functions, which insures the utmost compactness of the parts, simplicity and lightness of the mechanism, economy of construction, and minimum liability of derangement. By reduction of the weight of parts, and corresponding reduction of inertia in movement, a far higher speed of reciprocation of the valve gearing and consequent piston speed is attainable. In this connection, the configuration, construction and arrangement of the stationary bracket is of the utmost importance. It is received upon the extreme outer end of the bonnet, exterior to the bearing of the bell crank thereon, which comprises the levers F and $a^6$, on a cylindrical bearing concentric to that of the bell crank, but in any case of sufficiently lesser diameter to permit the bell crank to be easily passed to place over it. As the contact bearings of the bracket and the bonnet are cylindrical, they can be made to intimately correspond and thus insure a firm and reliable seating, and the possibility of turning the bracket upon the bonnet bearing and clamping it in any required position thereon, enables it to be adjusted with reference to the steam valve crank pin with facility and accuracy. Also its removal for the purpose of removing the bell crank or related parts is a matter of extreme simplicity, involving merely the slacking of its clamping screw $m$.

It will be seen that by journaling the cam lever $e^4$ on the hub $e^5$ of the bell crank, instead of upon the bonnet itself, the bearing of the crank is correspondingly lengthened. This increase of the length of the bell crank bearing insures stability of movement and is highly advantageous, and accomplished without proportionate lengthening of the steam bonnet.

The spring T is exterior to the steam crank and communication between the spring and a stationary abutment on the end of the steam bonnet must, therefore, be made through the steam crank. Such abutment is in this case the stationary bracket itself, which is provided with the pin $n$ projecting into the slot $n^1$ in the steam crank 9, to be engaged by the inner end $t$ of the spring coil as hereinbefore explained. This arrangement insures the following result, namely: In the closing movement of the valve by action of the spring and its arrest by air compression beneath the plunger $i^1$ in the dash pot or air cup $i^2$ which is supported upon the bracket, the thrust of the spring upon the valve crank, and the resisting pressure brought to bear upon the crank are both sustained by the stationary bracket in the form of forces of equal action and reaction in opposite directions, whereby the strains are neutral as regards the other parts of the cut-off mechanism. Hence said forces are neutral with respect to the other parts of the mechanism and do not tend to displace the stationary bracket in the bearing upon the bonnet. Therefore, a very small clamping force is sufficient to hold it in place, and jar and thump of parts are entirely avoided. The bracket and the steam crank are brought nearly in the same acting plane, and the strains on the respective parts are, therefore, exerted without material leverage tending to rack these parts upon each other.

The use of the ring $n^3$ movable concentric to the steam valve, and receiving the inner or relatively rotating end of the spring coil with reference to the valve crank, is important in forming a bearing for the oscillation of the coil on the hub $n^2$ of the crank, which otherwise would wear, and also contact and cramp upon the hub, to the detrimental action of the mechanisms.

I claim as my invention:

In liberating valve gear for steam engines, the combination of a bonnet, a valve stem having its bearing in the bonnet and projecting therefrom, a stationary bracket hung upon the end of the bonnet, a bell crank having its bearing on the bonnet interior and in juxtaposition to the bracket, a valve crank secured on the valve stem exterior and in juxtaposition to the bracket, a hook pivoted on the bell crank, an arm carried by the valve crank crossing the plane of the stationary bracket for engagement with the hook, tripping means controlled by a governor for releasing the hook and arm, a coil spring coacting between the projecting end of the valve stem and the stationary bracket to close the valve after release, and a piston and air compression cylinder coöperating between the arm and stationary bracket for arresting the closing movement of the valve after release, substantially as and for the purpose specified.

Signed by me at New Haven, Connecticut this 14th day of September 1908.

NELSON W. TWISS.

Witnesses:
MAXMILLIAN J. MARQUARDT,
GEORGE L. BARNES.

---

Copies of this patent may be obtained for five cents each, by addressing the "Commissioner of Patents, Washington, D. C."